US009819865B2

(12) United States Patent
Evans, V et al.

(10) Patent No.: US 9,819,865 B2
(45) Date of Patent: Nov. 14, 2017

(54) IMAGING DEVICE AND METHOD FOR GENERATING AN UNDISTORTED WIDE VIEW IMAGE

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US); Joseph Anthony Tate, San Jose, CA (US); Jason Sean Gagne-Keats, Cupertino, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/336,588

(22) Filed: Oct. 27, 2016

(65) Prior Publication Data

US 2017/0126972 A1   May 4, 2017

Related U.S. Application Data

(60) Provisional application No. 62/249,130, filed on Oct. 30, 2015, provisional application No. 62/300,631, (Continued)

(51) Int. Cl.
*H04N 5/247* (2006.01)
*H04N 19/46* (2014.01)
(Continued)

(52) U.S. Cl.
CPC ... *H04N 5/23238* (2013.01); *G06F 17/30268* (2013.01); *G06T 3/0062* (2013.01); (Continued)

(58) Field of Classification Search
CPC .. G06F 17/30268; G06F 21/602; G06T 11/60; G06T 2207/20221; G06T 3/0093;
(Continued)

(56) References Cited

U.S. PATENT DOCUMENTS 6,583,815 B1   6/2003 Driscoll et al.
6,795,113 B1   9/2004 Jackson et al.
(Continued)

FOREIGN PATENT DOCUMENTS

WO   2014106296 A1   7/2014

OTHER PUBLICATIONS

Evans V et al., International Search Report and Written Opinion in PCT/US16/59497 dated Jan. 17, 2017, 10 pages.
(Continued)

*Primary Examiner* — Reza Aghevli
(74) *Attorney, Agent, or Firm* — Perkins Coie LLP

(57) ABSTRACT

Certain aspects of the technology disclosed herein involve combining images to generate a wide view image of a surrounding environment. Images can be recorded using an stand-alone imaging device having wide angle lenses and/or normal lenses. Images from the imaging device can be combined using methods described herein. In an embodiment, a pixel correspondence between a first image and a second image can be determined, based on a corresponding overlap area associated with the first image and the second image. Corresponding pixels in the corresponding overlap area associated with the first image and the second image can be merged based on a weight assigned to each of the corresponding pixels.

15 Claims, 13 Drawing Sheets

Related U.S. Application Data filed on Feb. 26, 2016, provisional application No. 62/325,922, filed on Apr. 21, 2016, provisional application No. 62/380,201, filed on Aug. 26, 2016.

(51) Int. Cl.

| | | |
|---|---|---|
| *G06T 5/00* | (2006.01) | |
| *G06T 3/00* | (2006.01) | |
| *H04N 5/232* | (2006.01) | |
| *G06F 17/30* | (2006.01) | |
| *G06T 11/60* | (2006.01) | |
| *H04N 5/225* | (2006.01) | |
| *G06T 3/40* | (2006.01) | |
| *G06F 21/60* | (2013.01) | |

(52) U.S. Cl.
CPC .......... *G06T 3/0093* (2013.01); *G06T 3/4038* (2013.01); *G06T 5/006* (2013.01); *G06T 11/60* (2013.01); *H04N 5/2254* (2013.01); *H04N 5/2258* (2013.01); *H04N 5/247* (2013.01); *H04N 19/46* (2014.11); *G06F 21/602* (2013.01); *G06T 2207/20221* (2013.01)

(58) Field of Classification Search
CPC ...... G06T 5/006; H04N 19/46; H04N 5/2254; H04N 5/23238; H04N 5/247
USPC .......................................................... 348/38
See application file for complete search history.

(56) References Cited

U.S. PATENT DOCUMENTS

| | | | |
|---|---|---|---|
| 6,954,310 | B2 | 10/2005 | Holloway et al. |
| 7,646,404 | B2 | 1/2010 | Liu et al. |
| RE43,490 | E | 6/2012 | Gullichsen et al. |
| 8,730,299 | B1 | 5/2014 | Kozko |
| 8,818,101 | B1 | 8/2014 | Lim |
| 9,055,220 | B1 | 6/2015 | Kozko |
| 9,152,019 | B2 | 10/2015 | Kintner et al. |
| 9,521,321 | B1 | 12/2016 | Kozko et al. |
| 2004/0061787 | A1* | 4/2004 | Liu .................. H04N 5/232 348/218.1 |
| 2005/0058360 | A1 | 3/2005 | Berkey et al. |
| 2006/0056056 | A1 | 3/2006 | Ahiska et al. |
| 2007/0236595 | A1* | 10/2007 | Pan .................. G06T 3/0018 348/335 |
| 2008/0024594 | A1 | 1/2008 | Ritchey et al. |
| 2009/0002797 | A1 | 1/2009 | Kwong et al. |
| 2010/0002071 | A1* | 1/2010 | Ahiska .................. H04N 5/217 348/36 |
| 2010/0033551 | A1 | 2/2010 | Agarwala et al. |
| 2010/0045773 | A1 | 2/2010 | Ritchey et al. |
| 2010/0097442 | A1 | 4/2010 | Lablans et al. |
| 2010/0119172 | A1 | 5/2010 | Yu et al. |
| 2011/0002544 | A1* | 1/2011 | Oshima ................ G06K 9/6211 382/190 |
| 2011/0032368 | A1 | 2/2011 | Pelling et al. |
| 2011/0211040 | A1 | 9/2011 | Lindemann et al. |
| 2012/0044391 | A1 | 2/2012 | Ni et al. |
| 2012/0169842 | A1* | 7/2012 | Chuang .............. G08B 13/19619 348/39 |
| 2012/0242788 | A1* | 9/2012 | Chuang .............. G08B 13/19602 348/36 |
| 2012/0257008 | A1 | 10/2012 | Taylor et al. |
| 2013/0258044 | A1 | 10/2013 | Betts-Lacroix et al. |
| 2013/0278715 | A1* | 10/2013 | Nutsch ............... H04N 5/23238 348/38 |
| 2013/0321569 | A1 | 12/2013 | Agarwala et al. |
| 2013/0329002 | A1 | 12/2013 | Tico |
| 2014/0002588 | A1 | 1/2014 | Ahiska |
| 2014/0049609 | A1 | 2/2014 | Wilson et al. |
| 2014/0210940 | A1* | 7/2014 | Barnes ............... H04N 13/0022 348/36 |
| 2014/0267586 | A1 | 9/2014 | Aguilar et al. |
| 2014/0267596 | A1 | 9/2014 | Geerds et al. |
| 2014/0313377 | A1 | 10/2014 | Hampton et al. |
| 2015/0103197 | A1* | 4/2015 | Djordjevic ............ G06T 15/205 348/218.1 |
| 2015/0189140 | A1 | 7/2015 | Sutton et al. |
| 2015/0212653 | A1 | 7/2015 | Cable et al. |
| 2015/0244930 | A1 | 8/2015 | Ettinger et al. |
| 2015/0358539 | A1 | 12/2015 | Catt |
| 2015/0373279 | A1 | 12/2015 | Osborne et al. |
| 2016/0073104 | A1 | 3/2016 | Hillebrand et al. |
| 2016/0088280 | A1* | 3/2016 | Sadi ...................... H04N 19/54 348/48 |
| 2016/0198087 | A1 | 7/2016 | Georgiev |
| 2016/0219217 | A1 | 7/2016 | Williams et al. |
| 2016/0360104 | A1* | 12/2016 | Zhang .................. G06T 3/0062 |
| 2017/0126971 | A1 | 5/2017 | Evans et al. |
| 2017/0163889 | A1 | 6/2017 | Evans et al. |

OTHER PUBLICATIONS

Evans V et al., International Search Report and Written Opinion in PCT/US16/59535 dated Jan. 17, 2017, 12 pages.

Evans V et al., Non-Final Office Action dated Feb. 1, 2017 in U.S. Appl. No. 15/336,689, filed Oct. 27, 2016, 18 pages.

Evans V et al., Partial Search Report PCT/US16/59170 dated Mar. 7, 2017, 2 pages.

Evans V. et al., Final Office Action dated Mar. 21, 2017, in U.S. Appl. No. 15/161,153, filed May 20, 2016, 21 pages.

Evans V , et al., International Search Report and Written Opinion received in PCT Application No. PCT/US16/59524, dated Feb. 27, 2017; 10 pages.

Office Action dated Jun. 8, 2017 for Taiwanese Patent Application No. 105134935, 16 pages.

Advisory Action dated Jun. 2, 2017, in U.S. Appl. No. 15/161,153 of Evans et al., filed May 20, 2016.

International Report and Written Opinion dated May 19, 2017, for International Application No. PCT/US16/59170 dated May 19, 2017.

Non-Final Office Action dated Sep. 14, 2016, for U.S. Appl. No. 15/161,153 of Evans et al., filed May 20, 2016.

Restriction Requirement dated Jul. 27, 2016, for U.S. Appl. No. 15/161,153 of Evans et al., filed May 20, 2016.

Notice of Allowance dated May 18, 2017 for U.S. Appl. No. 15/336,689 of Evans et al., filed Oct. 27, 2016.

\* cited by examiner

IMAGING DEVICE AND METHOD FOR GENERATING AN UNDISTORTED WIDE VIEW IMAGE

CROSS-REFERENCE TO RELATED APPLICATIONS

This application claims priority to the: U.S. Provisional Patent Application Ser. No. 62/325,922, filed Apr. 21, 2016; U.S. Provisional Patent Application Ser. No. 62/249,130, filed Oct. 30, 2015; U.S. Provisional Patent Application Ser. No. 62/300,631, filed Feb. 26, 2016; U.S. Provisional Patent Application Ser. No. 62/380,201, filed Aug. 26, 2016; all of which are incorporated herein by reference in their entirety.

TECHNICAL FIELD

The present application is related to an apparatus and method for generating a wide view image, and more specifically to generating an undistorted 360° image of a surrounding environment.

BACKGROUND

Wide angle lenses used in cameras suffer from image distortion at the periphery of the lens. The resulting image presents a distorted view of the surrounding environment by, for example, showing straight lines as bent, showing distorted proportions of surrounding objects, etc. Conventional methods for processing distorted images can diminish image quality, especially for images, or portions of images, having substantial distortion (e.g., an outer edge of a fisheye image).

SUMMARY

Certain aspects of the technology disclosed herein involve combining images to generate a wide view image of a surrounding environment. Images can be recorded using an stand-alone imaging device having wide angle lenses and/or normal lenses. Images from the imaging device can be combined using methods described herein. In an embodiment, a pixel correspondence between a first image and a second image can be determined, based on a corresponding overlap area associated with the first image and the second image. Corresponding pixels in the corresponding overlap area associated with the first image and the second image can be merged based on a weight assigned to each of the corresponding pixels.

DETAILED DESCRIPTION

Figure 1B:
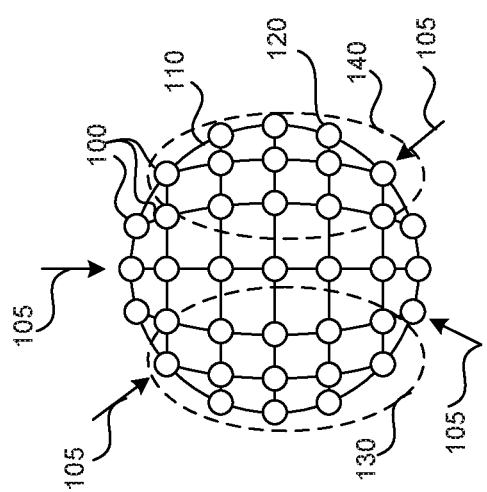
FIGS. 1A-1B show an imaging device to record a wide field of view of the environment, according to one embodiment.

Certain aspects of the technology disclosed herein combine wide angle lenses with normal lenses to create an undistorted wide view (e.g., 360° view) of the surrounding environment. The normal lenses record an image of the surrounding environment in the areas where the wide angle lenses provide a distorted view. The wide angle lenses and the normal lenses can be part of a stand-alone imaging device, can be accessories to a mobile device, or can be integrated into a mobile device. Various ways to create an undistorted wide view (e.g., 360° view) of the surrounding environment are disclosed herein.

In various embodiments disclosed herein, the mobile device can have a plurality of cameras, where the plurality of cameras comprises one or more camera embodiments disclosed here.

In various embodiments disclosed herein, an image can be a video, and the camera recording an image can be a camera recording a video.

Terminology

Brief definitions of terms, abbreviations, and phrases used throughout this application are given below.

Reference in this specification to "360° view" includes both a view obtained when a camera rotates 360° around a yaw axis, and a view obtained when the camera rotates 360° around a pitch axis. Reference in this specification to "360° image" includes both an image obtained when a camera rotates 360° around a yaw axis, and an image obtained when the camera rotates 360° around a pitch axis.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Imaging Device

Figure 1A:
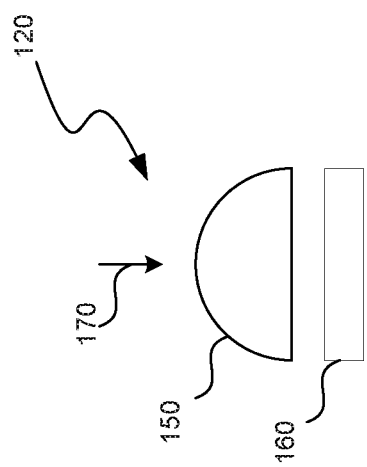

FIGS. 1A-1B show an imaging device to record a wide field of view of the environment, according to one embodiment. The imaging device comprises an array of cameras 100 disposed on a curved three-dimensional surface 110. In FIG. 1, for economy, only several of the array of cameras 100 are labeled. The array of cameras 100 includes a plurality of cameras 120. The array of cameras 100 receives a plurality of light beams 105 from a wide angle view (e.g., a 360° view). The curved three-dimensional surface 110 can take on any shape, such as an ellipsoid, a spheroid, a sphere, a cube with rounded edges, or any three-dimensional shape. Some shapes, for example, a shape with sharp edges or concave surfaces, may hinder certain viewing angles. Preferred embodiments include shapes with no sharp edges or concave surfaces.

The cameras 100 substantially covers the curved three-dimensional surface 110. The cameras 100 can be disposed on the curved three-dimensional surface 110 in a variety of ways: the cameras 100 can be uniformly distributed on the curved three-dimensional surface 110; the cameras 100 can be placed at the intersection of uniformly distributed longitude and latitude lines; the cameras 100 can be more densely distributed in the areas of interest, for example, in the front facing region 130 and/or the back facing region 140; etc. In an embodiment, camera density may be adjustable by enabling one or more cameras to move by, for example, including the one or more cameras on a track running along a length of the curved three-dimensional surface 110 and mechanically connecting the one or more cameras to an actuator. Increasing camera distribution density may improve picture quality by focusing additional cameras on an area of interest, such as, for example, a detected facial impression.

The array of cameras 100 can be disposed on a curved substrate. In one embodiment, the curved substrate matches the shape of the curved three-dimensional surface 110. In another embodiment, a plurality of curved substrates whose curvature does not match the curvature of the three-dimensional surface 110 can be disposed to substantially cover the three-dimensional surface 110.

In another embodiment, the array of cameras 100 is divided into smaller arrays of cameras, each smaller array of cameras disposed on a planar substrate. The size associated with each planar substrate is configured to be small compared to a curvature associated with the three-dimensional surface. The plurality of small arrays of cameras is placed on the curved three-dimensional surface to substantially cover the surface as described above.

Camera 120 represents a single camera in the array of cameras 100. In FIG. 1B, each camera 120 includes a lens 150 and a photo sensor 160. The lens 150 receives a light beam 170 and focuses the light beam on the photo sensor 160. The lens 150 can be any type of lens, such as a ball lens, a wide angle lens, or a lens having a focal length between an extremely short and an extremely long focal length. The lens 150 can be a small lens, such as a millimeter, micrometer, nanometer, picometer, etc., lens. The photo sensor 160 can be a CMOS sensor, a CCD sensor, or any sensor configured to sense light.

A processor, connected to the array of photo sensors, receives a plurality of images corresponding to the array of photo sensors. The processor creates an image comprising a wide angle view (e.g., a 360° view) of an environment around the imaging device. The processor can be disposed inside the three-dimensional surface, or can be disposed outside the three-dimensional surface. The imaging device described here can be a standalone camera or can be part of another device, such as a mobile device, etc.

Figure 2:
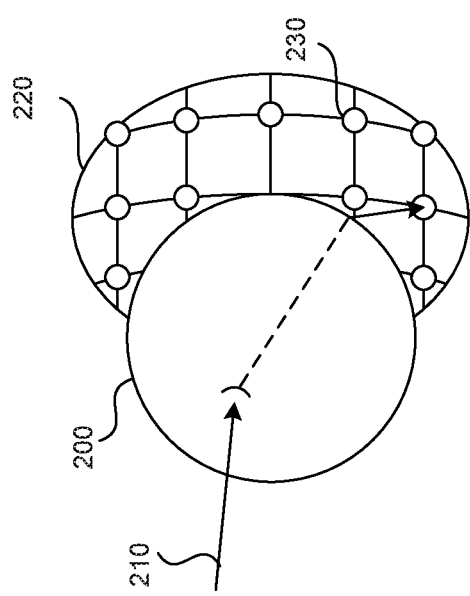
FIG. 2 shows an imaging device to record an approximately 180° view of the environment, according to one embodiment.

FIG. 2 shows an imaging device to record a 180° view of the environment, according to one embodiment. An ellipsoid lens 200, such as a ball lens, focuses a light beam 210 on a curved array of elements 220. Each element 230 in the array of elements 220 can be a camera 120, as described above, or a photo sensor 160 (in FIG. 1B). The curvature of the curved array of elements 220 corresponds to the curvature of the ellipsoid lens 200. For example, the curvature of the curved array of elements is the same as or proportional to the curvature of the ellipsoid lens 200. The curved array of elements 220 can be assembled according to any of the techniques described above.

Figure 3:
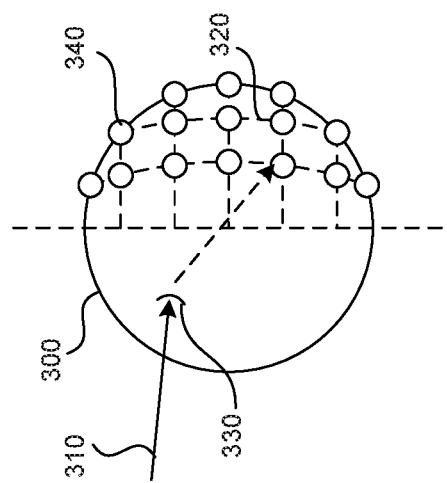
FIG. 3 shows an imaging device to record an approximately 180° view of the environment, according to another embodiment.

FIG. 3 shows an imaging device to record a 180° view of the environment, according to another embodiment. An ellipsoid lens 300, such as a ball lens, focuses a light beam 310 on a curved array of elements 320. Each element 340 in the array of elements 320 can be a camera 120, as described above, or a photo sensor 160 (in FIG. 1B). The array of elements 320 is disposed on half of the ellipsoid lens 300, and the element 340 receives the light beam 310 after the light beam diffracts at the entry point 330. The curved array of elements 320 can be assembled according to any of the techniques described above.

By combining two or more imaging devices disclosed in FIGS. 1-3, a wide view (e.g., 360° view) of the environment can be recorded.

Figure 4:
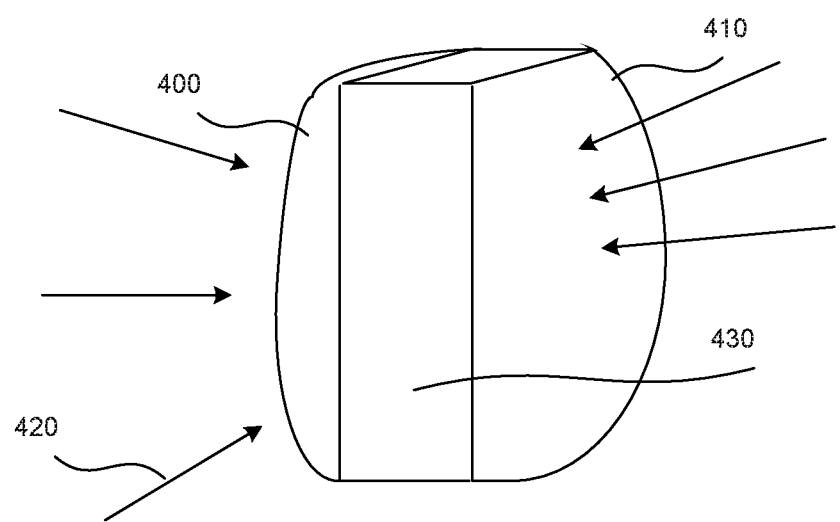
FIG. 4 shows a wide field of view imaging device, according to another embodiment.

FIG. 4 shows a wide field of view imaging device, according to another embodiment. The imaging device includes two wide angle lenses 400, 410 receiving a plurality of light beams 420. For economy, only one light beam 420 is labeled in the figure. Element 430 houses internal optics of the imaging device.

Figure 5A:
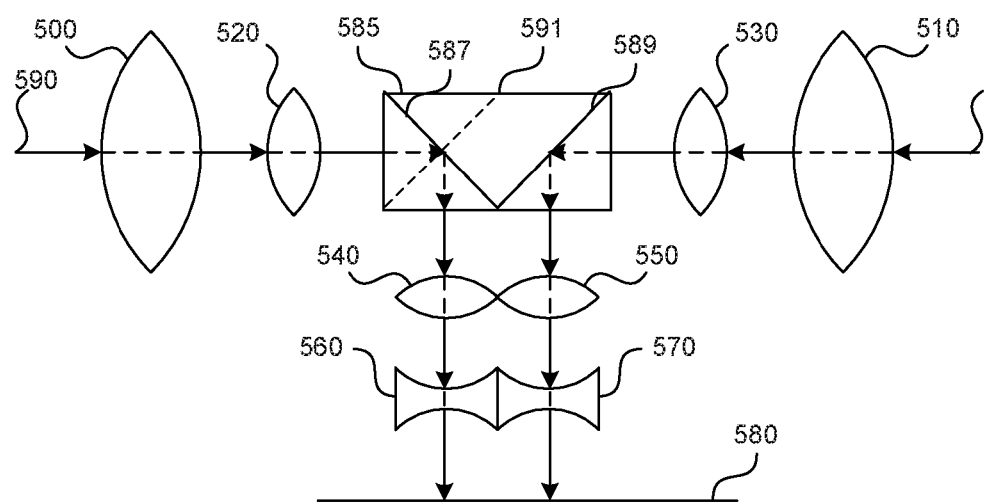
FIG. 5A shows the internal optics of a wide field of view imaging device, according to one embodiment.

FIG. 5A shows the internal optics of a wide field of view imaging device, according to one embodiment. Elements 500 and 510 are wide angle lenses receiving a plurality of light beams 590, 595 from up to 180° around the imaging device. Elements 520 and 530 are convex lenses receiving the plurality of light beams 590, 595 from the plurality of wide angle lenses 500, 510, and focusing a light beam in the plurality of light beams 590, 595 onto a deflector 585.

The deflector 585 receives the plurality of light beams 590, 595 from the first plurality of convex lenses 520, 530, and the deflector 585 changes a direction of the plurality of light beams 590, 595 to direct the plurality of light beams 590, 595 to a second plurality of convex lenses 540, 550. The deflector 585 can be a prism or a mirror. The deflector 585 can be stationary, or it can be actuated by micro-electromechanical systems (MEMS) devices, nano-electromechanical systems (NEMS) devices, pico-electromechanical systems (PENS) devices, etc. For example, the deflector can be a single mirror or prism that changes positions between position 587, deflecting the light beam 590, and position 589, deflecting the light beam 595. In another embodiment, the deflector 585 can assume position 591, deflecting the light beam 595 to the lenses 540, 560, thus obviating the need for lenses 550, 570.

The second plurality of convex lenses 540, 550 receives the plurality of light beams 590, 595 from the deflector 585, and focuses the plurality of light beams 590, 595 onto a plurality of concave lenses 560, 570.

The plurality of concave lenses 560, 570 receives the plurality of light beams 590, 595 from the second plurality of convex lenses 540, 550, and the plurality of concave lenses 560, 570 directs the plurality of light beams 590, 595 to an array of photo sensors 580.

The array of photo sensors 580 receives the plurality of light beams 590, 595 from the plurality of concave lenses 560, 570, and forms a plurality of images corresponding to the first plurality of convex lenses 500, 510. The array of photo sensors 580 can have various sizes, such as 16×9 mm and 4×3 mm.

A processor, connected to the array of photo sensors 580, receives the plurality of images and creates an image comprising a wide view (e.g., 360° view) around the imaging device. Software associated with the processor may identify and correct lens artifacts and/or distortions, and correlates the two images to create a wide angle view (e.g., a 360° view) around the imaging device.

Figure 5B:
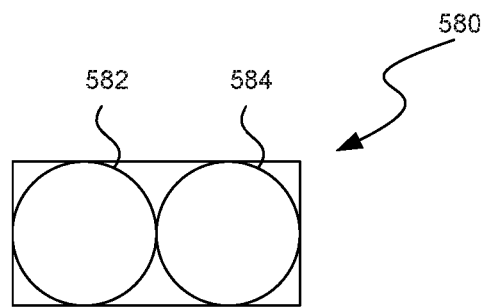
FIG. 5B shows the images formed by the array of photo sensors, according to one embodiment.

FIG. 5B shows the images formed by the array of photo sensors 580, according to one embodiment. The array of photo sensors 580 can form two images 582, 584 corresponding to the two convex lenses 500, 510. The size of the array of photo sensors 580 can be 16×9 mm. In another embodiment, in the case of an actuated deflector 585 assuming positions 587 or 591, the array of photo sensors 580 can form a single image 682, as depicted in FIG. 6B. The single image 682 alternates between corresponding to the image associated with a lens 500, and the image associated with a lens 510.

Figure 6A:
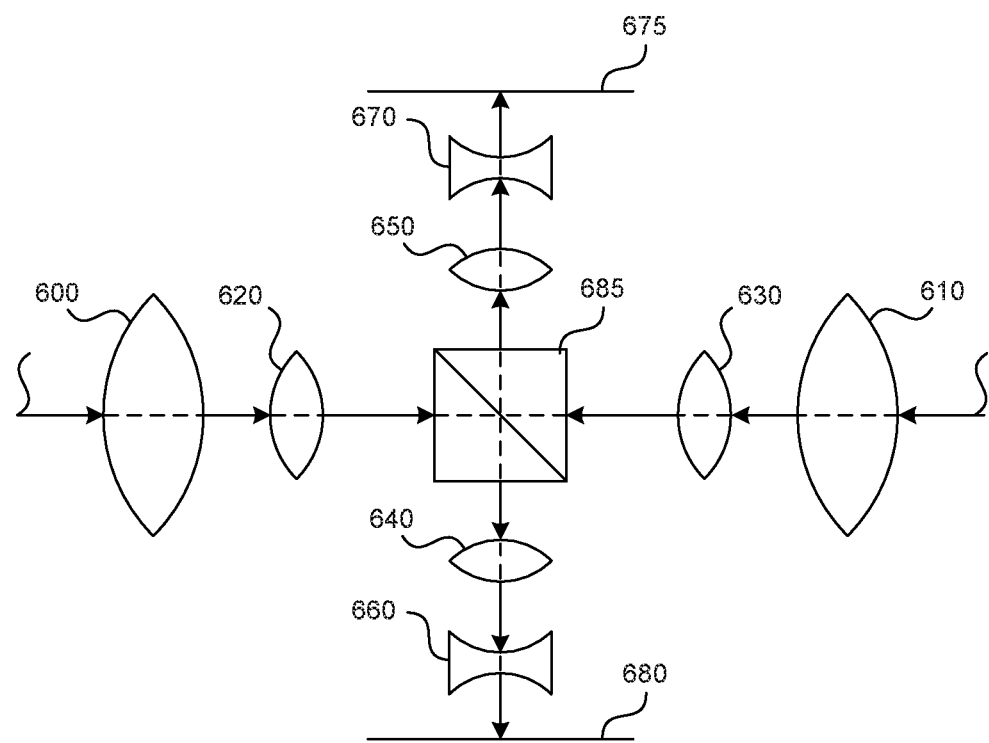
FIG. 6A shows the internal optics of a wide field of view imaging device, according to another embodiment.
Figure 6B:
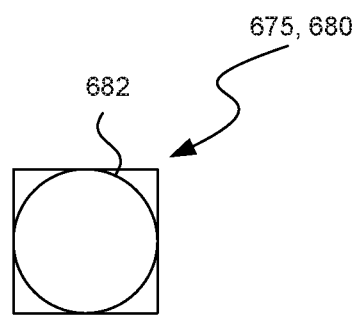
FIG. 6B shows the image formed by the plurality of photo sensor arrays, according to one embodiment.

FIG. 6A shows the internal optics of a wide field of view imaging device, according to another embodiment. Elements 600-630 correspond to the elements 500-530 in FIG. 5A, respectively. Deflector 685 receives the plurality of light beams 690, 695 from the first plurality of convex lenses 620, 630, and the deflector 685 changes a direction of the plurality of light beams 690, 695 to direct the plurality of light beams 690, 695 to a second plurality of convex lenses 640, 650. The deflector 685 can be a prism or a mirror. The deflector 685 can be stationary, or it can be actuated by micro-electromechanical systems (MEMS) devices, nano-electromechanical systems (NEMS) devices, pico-electromechanical systems (PENS) devices, etc.

Similarly to FIG. 5A, the convex lenses 640, 650 and the concave lenses 660, 670 focus the light beams 690, 695 to the plurality of photo sensor arrays 675, 680. The plurality of photo sensor arrays 675, 680 receives the plurality of light beams 690, 695 from the plurality of concave lenses 660, 670 and forms a plurality of images corresponding to the first plurality of convex lenses 600, 610.

FIG. 6B shows the image 682 formed by the plurality of photo sensor arrays 675, 680, according to one embodiment. The plurality of photo sensor arrays 675, 680 can have photo sensors of various sizes, such as 4×3 mm.

To obtain a three-dimensional representation of the environment, such as a stereoscopic image or a stereoscopic video, various 360° cameras disclosed here can be combined to simultaneously record an image of the environment from different points of view. For example, an imaging device disclosed in FIG. 1A can be combined with an imaging device disclosed in FIG. 4 to simultaneously record an image of the environment. In another embodiment, a three-dimensional representation of the environment, such as a stereoscopic image, may be generated by positioning a single device (e.g., an imaging device disclosed in FIG. 1A or an imaging device disclosed in FIG. 4) in a first position followed by placing the device in a second position. A processor, coupled to both of the cameras, can produce a three-dimensional image or a video, based on both of the imaging device recordings.

Methods for Recording and Processing Images

Figure 7:
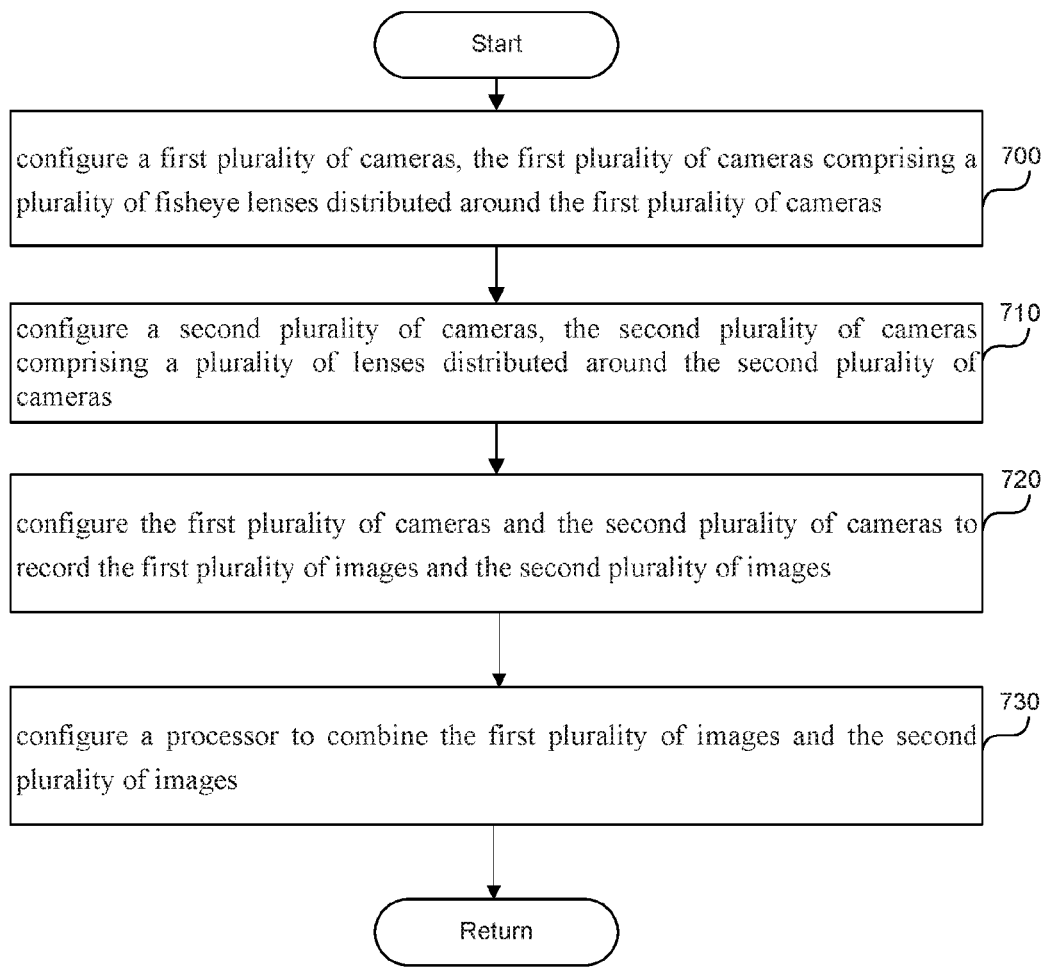
FIG. 7 is a flowchart of a process to record an undistorted wide view of a surrounding environment, according to one embodiment.

FIG. 7 is a flowchart of a process to record an undistorted wide view (e.g., 360° view) of a surrounding environment, according to one embodiment. In step 700, a first plurality of cameras is configured. The first plurality of cameras includes a plurality of fisheye lenses distributed around the first plurality of cameras. The first plurality of cameras is configured to record a first plurality of images associated with the surrounding environment. Each image in the first plurality of images comprises an image periphery distorted by a fisheye lens in the plurality of fisheye lenses, and an image center undistorted by the fisheye lens.

In step 710, a second plurality of cameras is configured. The second plurality of cameras includes a plurality of lenses distributed around the second plurality of cameras. The second plurality of cameras is configured to record a second plurality of images associated with the surrounding environment. Each image in the second plurality of images comprises an image center undistorted by a camera in the second plurality of cameras. The plurality of image centers associated with the second plurality of images overlaps the plurality of image peripheries associated with the first plurality of images.

In step 720, the first plurality of cameras and the second plurality of cameras are configured to record the first plurality of images and the second plurality of images. The images can be recorded synchronously. A timestamp can be included in metadata associated with the images so images having a timestamp within a time span (e.g., a fraction of a second to several seconds) of the timestamp can be associated with a same time during one or more processing steps (e.g., combining images).

In step 730, a processor is configured to combine the first plurality of images and the second plurality of images into an image undistorted by the plurality of fisheye lenses. The combined image can be a wide-view image (e.g., a 360° image) of a surrounding environment. Embodiments for combining images are discussed below with reference to FIGS. 9-13.

Figure 8A:
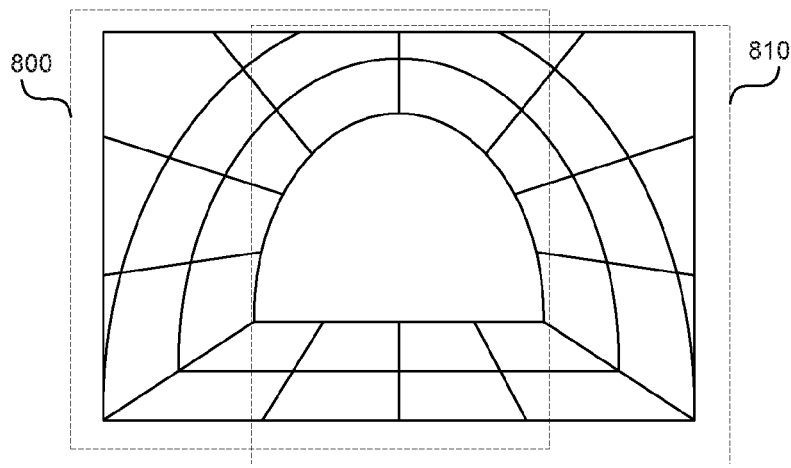
FIG. 8A shows an image recorded by a normal lens associated with a second plurality of cameras, according to one embodiment.

FIG. 8A shows an image recorded by a normal lens associated with a second plurality of cameras, according to one embodiment. The image is that of a cobblestone tunnel. The image is undistorted, and shows the environment as a human eye would perceive the environment. The area of the image 800 overlaps with an image recorded by a wide angle lens in the first plurality of cameras, where the wide angle lens is disposed to the left of the normal lens. The area of the image 810 overlaps with an image recorded by a wide angle lens in the second plurality of cameras, where the wide angle lens is disposed to the right of the normal lens.

Figure 8B:
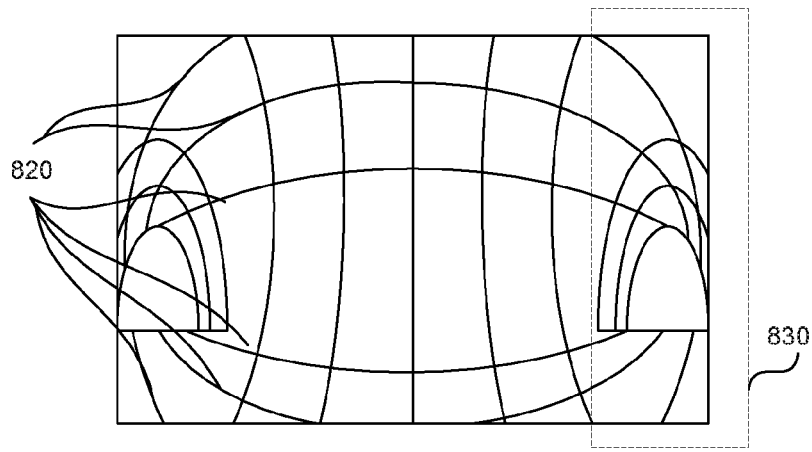
FIG. 8B shows an image recorded by a wide angle lens associated with the first plurality of cameras, according to one embodiment.

FIG. 8B shows an image recorded by a wide angle lens associated with the first plurality of cameras, according to one embodiment. The wide angle lens is disposed at 90° with respect to the normal lens from FIG. 8A. Otherwise, the position and orientation of the wide angle lens is the same as the position orientation of the normal lens in FIG. 8A. The image is distorted because straight lines are depicted as curved lines 820. Area of the image 830 overlaps with the area of the image 800 in FIG. 8A.

Figure 8C:
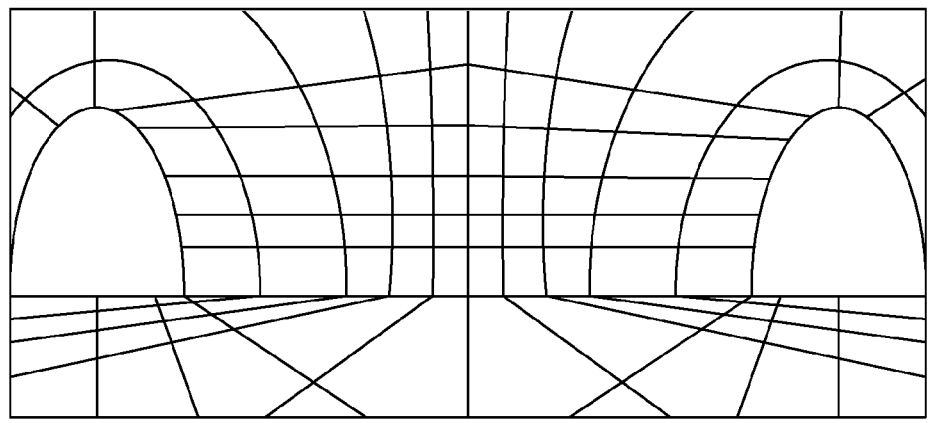
FIG. 8C shows an undistorted image obtained by combining images associated with the first plurality of cameras and images associated with the second plurality of cameras, according to one embodiment.

FIG. 8C shows an undistorted image obtained by combining images associated with the first plurality of cameras and images associated with the second plurality of cameras, according to one embodiment. A processor receives images associated with the first plurality of cameras, and images associated with the second plurality of cameras, and combines the images to produce an undistorted image. The image shown is a 180° image associated with a first wide angle lens in the first plurality of cameras. The processor can produce a similar 180° image associated with a second wide angle lens in the first plurality of cameras.

Figure 9:
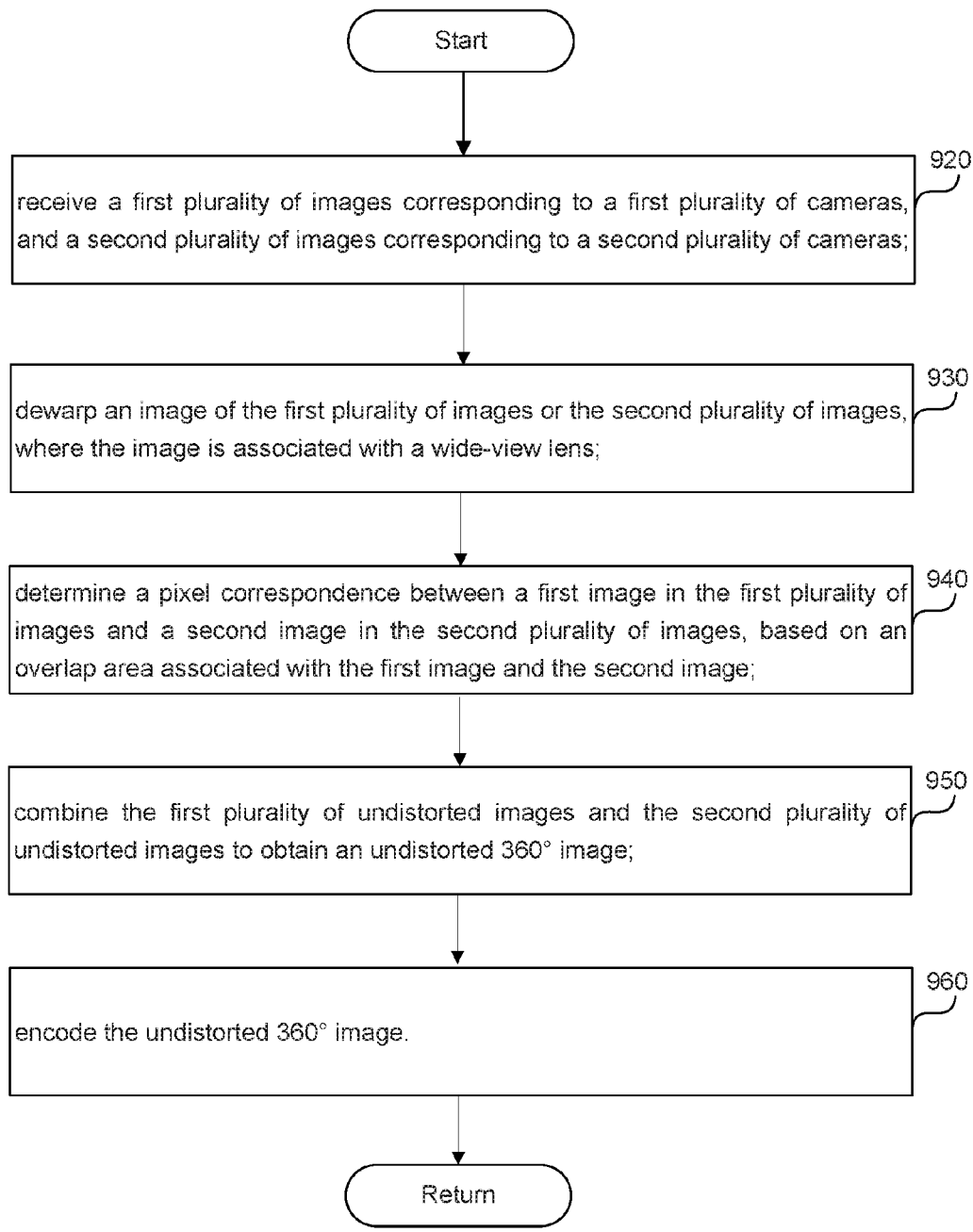
FIG. 9 is a flowchart describing a process for stitching a plurality of images into a single image, according to one embodiment.
Figure 10A:
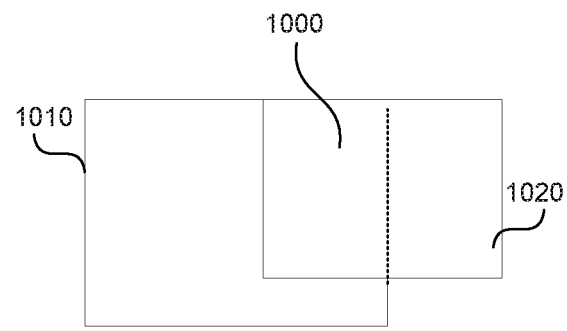
FIGS. 10A-10C show a process for stitching a plurality of images into a single image, according to one embodiment.
Figure 10B:
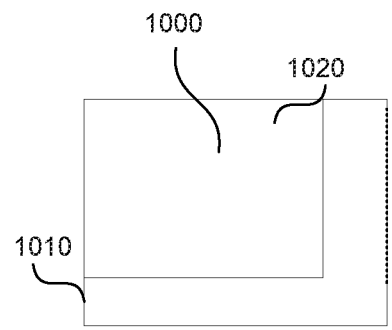
Figure 10C:
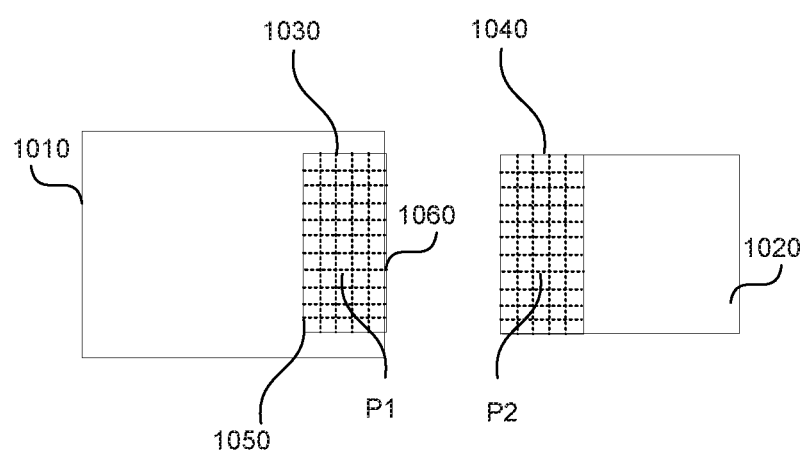
Figure 11:
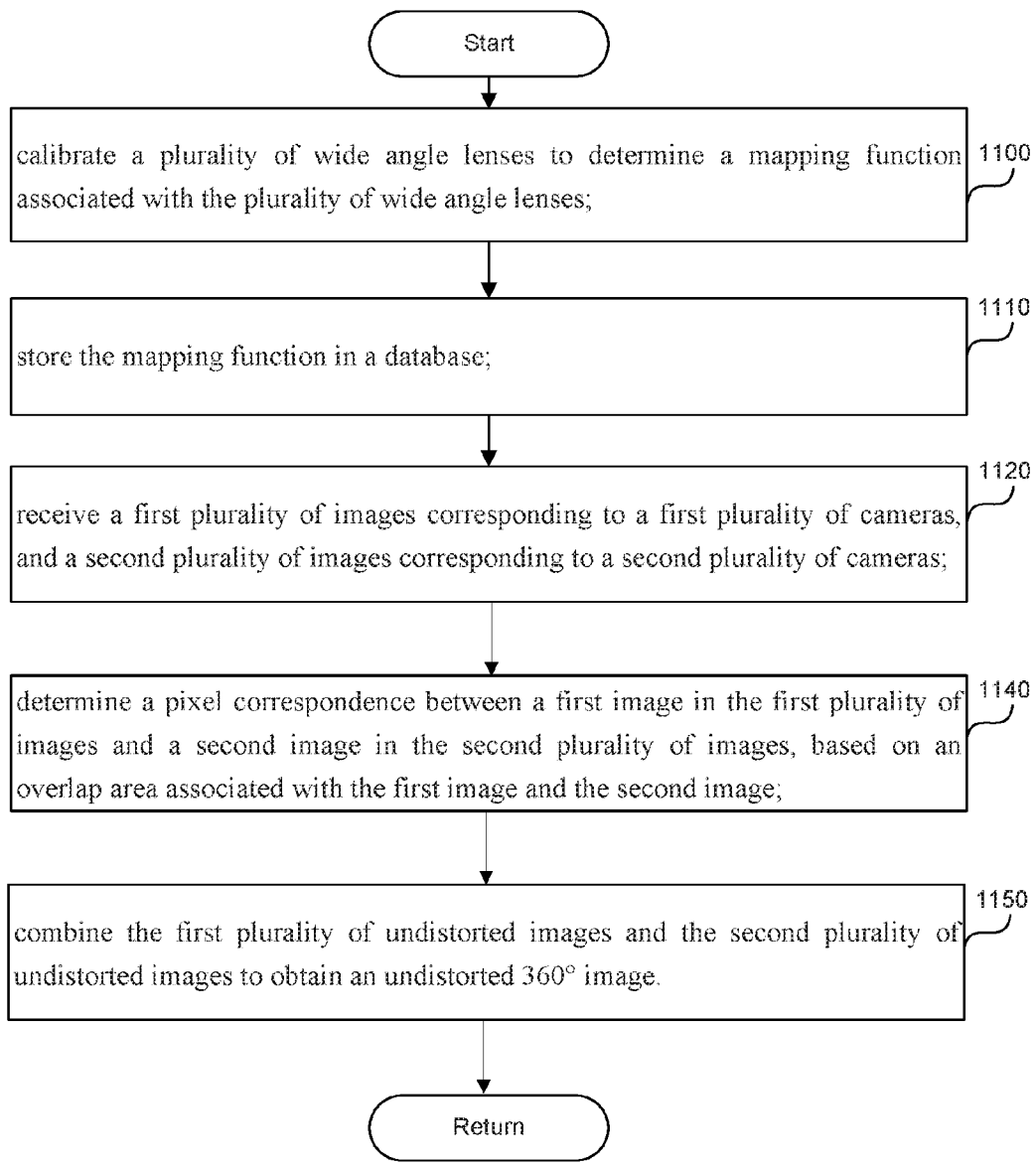
FIG. 11 is a flowchart describing a process for stitching a plurality of images into a single image, according to one embodiment.

FIGS. 9-13 show methods for processing a plurality of images, according to several embodiments. FIGS. 9 and 11 are flowcharts describing processes for stitching a plurality of images into a single image (e.g., a single 360° image), according to several embodiments. FIGS. 10A-10C and FIGS. 12A-12B are examples of a process for stitching images, which are referred to throughout the discussion of FIGS. 9 and 11. Several embodiments for stitching a plurality of images into a single image are contemplated. Embodiments include mapping a first image with a second image based on pattern recognition, as described with reference to FIG. 9. Embodiments include calibrating an imaging device to assist in determining an overlap of one or more images, as described with reference to FIG. 11. Embodiments include identifying objects of interest in an image (for facilitating, e.g., cropping objects, focusing on objects, defining a region for local dewarping, etc.), as described with reference to FIG. 13.

FIG. 9 is a flowchart describing a process for stitching a plurality of images into a single image (e.g., a single 360° image), according to one embodiment. An example of a process for stitching images is shown in FIGS. 10A-10C, which will be referred to throughout the discussion of FIG. 9.

In step 920, the processor receives a first plurality of images corresponding to a first plurality of cameras, and a second plurality of images corresponding to a second plurality of cameras. In an embodiment, the first plurality of cameras can comprise a plurality of wide angle lenses, where the second plurality of cameras can comprise a plurality of wide angle lenses, and/or can comprise a plurality of normal lenses. The first plurality of cameras and/or the second plurality of cameras may record images having a wide field of view, images having a standard field of view, or a combination thereof. Thus, the first plurality of images and/or the second plurality of images may include images having a wide field of view, images having a standard field of view, or a combination thereof.

In an embodiment, a database may include field of view information for each camera. A processor may retrieve field of view information for each camera and attach the field of view information to a recorded image as metadata. For example, a processor may attach "wide field of view" metadata to an image of the first set of images. In another example, a processor may attach "standard field of view" metadata to an image of the second set of images. The metadata including field of view information can be used to, for example, identify images for dewarping, as described below with reference to step 930.

In step 930, the processor can dewarp an image of the first plurality of images or the second plurality of images, according to one embodiment. Dewarping an image may involve generating a perspective corrected field of view from a wide angle image (e.g., an image of the first plurality of images corresponding to the first plurality of cameras). In an embodiment, a dewarped image can be stitched with another image (e.g., another dewarped image, an image associated with a standard lens, or an image associated with a wide-view lens), as discussed below with reference to steps 940 and 950.

In an embodiment, the processor can dewarp images including "wide field of view" metadata attached to the images. In an embodiment, the processor may retrieve field of view data from a database to identify which images on which to perform dewarping. In an embodiment, the processor may identify a distortion pattern in one or more objects in an image and perform dewarping on images having a distortion and/or curvature pattern. For example, the processor may identify a bookcase in an image and determine that the bookcase has a curvature increasing with a distance from a center of an image. Based on the curvature pattern of the object (e.g., the bookcase), the processor can determine the image includes a wide field of view and can dewarp the image. In another embodiment, a mapping function associated with any of the wide view cameras can be used to dewarp images captured by a corresponding camera. Embodiments for generating the mapping function are described below with reference to FIG. 11.

In some embodiments, step 930 can be omitted. Dewarping may reduce image quality, particularly for generating a perspective corrected field of view near an outer edge of a wide-angle image. In embodiments omitting step 930, image stitching may be performed between images associated with a wide-view lens and another image (e.g., an image associated with a standard lens, or an image associated with a wide-view lens), as discussed below with reference to steps 940 and 950.

In step 940, the processor determines a pixel correspondence between a first plurality of images recorded by the first plurality of cameras, and the second plurality of images recorded by the second plurality of images, for a given relative position of the first and second plurality of cameras. In an embodiment, determining a pixel correspondence may include (1) determining a corresponding overlap area between a first image (e.g., from the first plurality of images) and a second image (e.g., from the second plurality of images) and (2) identifying a correspondence between a set of pixels of the first image to a set of pixels of the second image.

In an embodiment, an corresponding overlap area between a first image 1010 and a second image 1020 may be determined, as depicted in FIG. 10A. Embodiments include a processor selecting a first overlap area and shifting one pixel at a time for each overlap area. The processor may determine a match score for each overlap area and identify the overlap area having the highest match score as the corresponding overlap area. In an example, a processor may identify a minimum overlap area (e.g., a single pixel line overlap) between the two images and identify additional overlap areas by shifting one pixel at a time for each overlap area. In another example, a processor can identify a maximum overlap area (e.g., as in FIG. 10B) between the two images and identify additional overlap areas by shifting one pixel at a time for each overlap area and calculate a match score for each overlap area.

With reference to FIGS. 10A-10B, a processor may determine that an overlap area having a highest match score is the corresponding overlap area between the first image 1010 and the second image 1020. For example, starting with the maximum overlap (e.g., area 1000 in FIG. 10B), whether partial or full, the processor can move the images with respect to each other pixel line by pixel line, both vertically and horizontally until there is no overlapping pixel between images 1010, 1020, and calculate a match score for each overlap area. The match score can be calculated using various image matching algorithms, such as least-squares match. The overlap area having a highest match score may be identified as the corresponding overlap area (e.g., area 1000 in FIG. 10A).

In an embodiment, the corresponding overlap area may be further analyzed to determine a correspondence between sets of pixels in the first and second images. In some embodiments, determining a correspondence between sets of pixels can be omitted. For example, if a match score between the corresponding overlap area is high or nearly perfect, determining a correspondence between sets of pixels can be omitted. A match score for the corresponding overlap area may be high or nearly perfect if, for example, the first and second images are both standard images (e.g., not recorded from a fisheye camera). In embodiments where at least one of the first and second images is recorded from a fisheye camera, further analysis to determine a correspondence between sets of pixels in the first and second images can be necessary to correct distortion.

In an embodiment, a correspondence between a set of pixels of the first image 1010 to a set of pixels of the second image 1020 may be identified. Correspondence can be identified, for example, between a single pixel in each image and/or more than one pixel in each image. Embodiments include determining pixel correspondence between various types of images, such as, for example, images associated with a standard lens, images associated with a wide-view lens, dewarped images, and combinations thereof. For example, in determining pixel correspondence, the processor can determine the area 800 in FIG. 8A associated with a normal lens, and the corresponding area 830 in FIG. 8B associated with a wide angle lens. The processor can establish a one-to-one correspondence between each pixel in the area 800 in FIG. 8A and each pixel in the area 820 FIG. 8B.

Referring to FIG. 10C, the processor may determine a pixel correspondence between the image 1010 in the first plurality of images and the image 1020 in the second plurality of images. To determine the pixel correspondence, the processor can apply a mapping function to corresponding overlap area 1030, 1040. For example, the mapping function may identify a first set of pixels of area 1030 (e.g., P1) having a statistical correlation to a second set of pixels of an area 1040 (e.g., P2). The mapping function can calculate a match score between the first set of pixels and the second set of pixels by determining a correspondence between sets of adjacent pixels near the first set of pixels and the second set of pixels. Sets of adjacent pixels can be, for example, directly above, below, or to a side of the first set of pixels and the second set of pixels. The match score can be used to confirm or deny a relationship between the first set of pixels and the second set of pixels based on a threshold correlation. Examples of threshold correlations can include, for example, a set of adjacent pixels having at least a percent (e.g., fifty percent, sixty percent, etc.) of matching pixels, at least a percentage (e.g., fifty percent, sixty percent, etc.) of adjacent pixels having at least a percentage (e.g., fifty percent, sixty percent, etc.) of matching pixels. Pixel correspondence data (e.g., a correspondence between a first and second set of pixels, match score, etc.) can be stored in a database or incorporated into the images as metadata.

By determining a corresponding overlap area between a first and second image, followed by identifying a correspondence between sets of pixels of the first and second image within the corresponding overlap area, a finely tuned pixel correspondence may be achieved, even with a substantially distorted image (e.g., an outer edge of a fisheye image). This is because the method disclosed herein can narrows an area with which to search for corresponding pixels, thus reducing errors and increasing identification speed.

In step 950, the processor can combine the first plurality of images and the second plurality of images to obtain an undistorted wide-view image (e.g., a 360° image). Embodiments include combining the first plurality of images and the second plurality of images by, for example, merging corresponding pixels in a corresponding overlap area.

Various embodiments for merging pixels are contemplated. In an embodiment, corresponding pixels may be merged evenly (e.g., an even mix of color, brightness, etc. from a first set of pixels and a second set of pixels). In an another embodiment, corresponding pixels may be merged based on a weighted distortion factor. The weighted distortion factor may be based on an estimated distortion in a location of a pixel. For example, for a fisheye image, a weighted distortion factor may increase an influence of pixels near a center of the fisheye image and decrease an influence of pixels near an outer edge of the fisheye image. A weighted distortion factor may have a rate of change extending from a center of a fisheye image outward. A rate of change of a weighted distortion factor may be, for example, linear, exponential, etc. A rate of change of the weighted distortion may be fixed and assigned to images captured from a camera (e.g., exponential rate of change for images from fisheye cameras) or may be adjustable and updated based on an analysis of a distortion rate for images received from a camera.

In an example, corresponding pixels (e.g., P1 and P2) in the corresponding overlap areas 1030, 1040 in FIG. 10C may be merged. A pixel P1 may be associated with the overlap area 1030 in FIG. 10B and a corresponding pixel P2 may be associated the overlap area 1040 in FIG. 10B. The processor may assign a weighted distortion factor from 0 to 1 for each pixel, so that the sum of weights always equals to one. The processor creates a new pixel P0, which is equal to W1*P1+(1−W1)*P2, where 0<=W1<=1. The weighted distortion factor W1 is determined based on the distance of pixel P1 to an inner edge 1050 associated with the overlap area. When the pixel P1 is right next to the edge 1050, W1 is 1. The weight W1 decreases until W1 reaches 0, at an outer edge 1060. The decrease can be linear, quadratic, cubic, etc., or the decrease can be discreet so that after a specified distance from the edge 1050, the weight W1 becomes 0. The specified distance can be one pixel, two pixels, etc., up to half of the pixels contained in the area 1030.

By merging a first pixel (e.g., P1), or set of first pixels, with a second pixel (e.g., P2), or set of first pixels, a new pixel (e.g., P0), or a set of new pixels, may be generated. The newly generated pixel, or set of pixels, may be used to generate a wide-view image (e.g., a 360° image). For example, corresponding pixels in corresponding overlap areas of a plurality of images (e.g., images recorded from a plurality cameras surrounding a 360° imaging device) can each be merged to generate a continuous undistorted wide-view image (e.g., 360° image).

Further image processing (e.g., image encoding) of a generated wide-view image (e.g., 360° image) is contemplated by some embodiments but may not be required. Possible further processing is described below with reference to step 960.

In step 960, image encoding can be performed, for instance, after receiving images (e.g., as in step 920), after dewarping images (e.g., as in step 930), after determining pixel correspondence (e.g., as in step 940), after combining images (e.g., as in step 950), or following another step. In one embodiment, encoding can be performed on an undistorted 360° image generated by combining a plurality of images. Embodiments include image encoding occurring in response to performance one or more steps, such as, for example, step 920, step 930, step 940, step 950, or any combination thereof. Image encoding as referred to in step 960 can include any of compression, encryption, or other alteration of pixels. In an embodiment, image encoding can be performed prior to writing images to an image stream.

In an embodiment, image encoding in step 960 can include image compression. Image compression can be used to enable more efficient storage and/or transmission of image data. Image compression may be performed using, for example, run-length encoding, area image compression, differential pulse-code modulation, entropy encoding, or any combination thereof. In an embodiment, a processor can be included within a 360° imaging device. The processor can identify redundant image data in a plurality of images recorded by the 360° imaging device. The processor can store redundant image data can as a single data value and insert a reference to the single data value in place of the redundant image data. In an example, as further described with reference to FIG. 19, one or more objects in an image can be detected. The detected object(s) in a plurality of images may include redundant image data. For example, a face may be a detected object in images recorded by the 360° imaging device. A first plurality of images can include the detected face (e.g., recorded by a first camera of the 360° imaging device) and a second plurality of images including the detected face (e.g., recorded by a second camera of the 360° imaging device). The detected face may include identified features stored in a detected objects database. A reference to the detected objects database may be inserted into the image code for the first plurality of images including the detected face and the second plurality of images including the detected face. By referring to the detected objects database rather than including the image code for the detected face, the size of the image data can be reduced.

In an embodiment, image encoding in step 960 can include image encryption. The image encryption may include, for example, converting plaintext code of an image into cipher text, visual cryptography, or a combination thereof. In some embodiments, image encryption can occur to reduce a likelihood that image information can be retrieved by an unauthorized user. For example, a drone can be equipped with a 360° imaging device having a processor within the 360° imaging device. The processor can encrypt images (e.g., as soon as images are received or as soon as images are combined) and store encrypted images (e.g., 360° images) in a database. In the event that the drone equipped with the 360° imaging device is acquired by an unauthorized user, the encrypted images can be much more difficult to view than standard images. Thus, encryption of images recorded by a 360° imaging device can reduce a likelihood of revealing sensitive image information.

In an embodiment, image data may be encrypted by converting plaintext code of an image into cipher text. Image data can be a matrix consisting of an RGBA (Red Green Blue Alpha) color space. Each pixel in the matrix can include a color value and an alpha value. If image compression is performed, reference values may be substituted in place of one or more portions of an image. The reference values may refer to one or more reference tables (e.g., a detected objects database). The reference values can be provided as plaintext code. A processor may convert the reference values into cipher text, making one or more portions (e.g., a detected object referenced in an image)

unviewable without deciphering the cipher text. In an embodiment, detected objects in an image can be objects associated with a significant portion of an image. For example, a detected object can be a face in an image. By encrypting references to detected objects, significant portions of an image (e.g., a face in an image) may be rendered unviewable without deciphering the cipher text.

In an embodiment, image data may be encrypted by using visual cryptography. Visual cryptography may be performed by splitting an image into separate portions and retaining a reference indicating which separate portions to unify to regenerate the image. Visual cryptography can be performed electronically by separating portions (e.g., checkerboard, scattered sequence of pixels, or other unique shapes) of image data (e.g., the RGBA color space) and identifying a reunification method. For example, an original image can be split into a first checkerboard portion of the RGBA color space and a second checkerboard portion of the RGBA color space. The first checkerboard portion of the RGBA color space may be stored in a first database, and the second checkerboard portion of the RGBA color space may be stored in a second database. A reference may be generated indicating a file in the first database and a file in the second database associated with the original image. The reference may be plaintext code. The reference may be converted into cipher text, thus making the original image difficult to view without deciphering the cipher text.

Figure 12A:
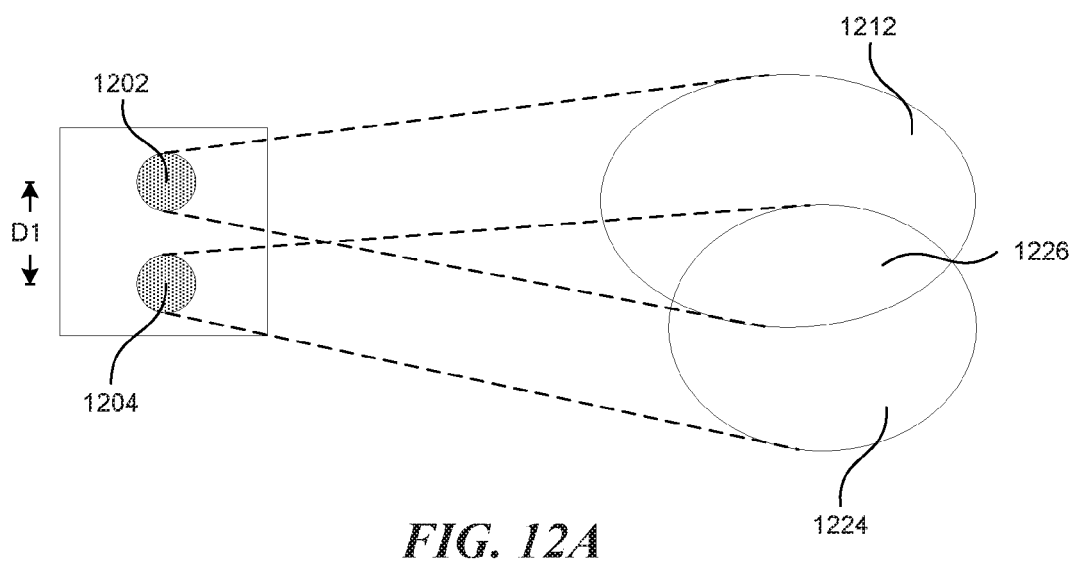
FIGS. 12A-12B show a process for stitching a plurality of images into a single image, according to one embodiment.
Figure 12B:
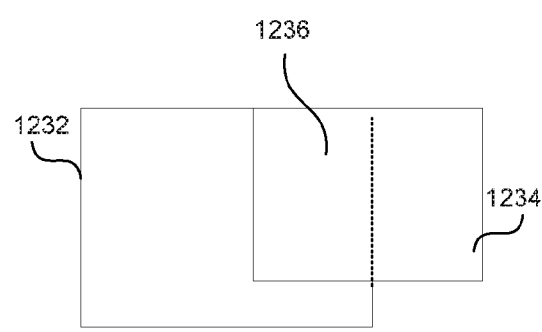

FIG. 11 is a flowchart describing a process for stitching a plurality of images into a single image (e.g., a single 360° image) including calibrating an imaging device to assist in determining an overlap of one or more images, according to an embodiment. An example of a process for calibrating an imaging device and stitching images is shown in FIGS. 12A-12B, which will be referred to throughout the discussion of FIG. 11.

In step 1100, a plurality of wide angle lenses may be calibrated to determine a mapping function associated with the plurality of wide angle lenses. The calibration may include (1) determining a lens distortion of any of the plurality of wide angle lenses, and (2) determining a spatial relationship between any of the plurality of wide angle lenses.

In an embodiment, the calibration of step 1100 includes determining a lens distortion of any of the plurality of wide angle lenses (e.g., wide angle lenses of the plurality of cameras of the 360° imaging device). For example, a processor can calibrate a plurality of wide angle lenses (e.g., fisheye lenses) to determine the distortion associated with any of the plurality of wide angle lenses. The processor can determine a mapping function between an image recorded by any of the wide angle lenses in the first plurality of cameras and an equivalent image recorded by a normal lens. The equivalent image is the image recorded by the normal lens positioned and oriented the same as an image recorded by the wide angle lens. The mapping function includes a transformation, where when the transformation is applied to the image recorded by the wide angle lens, the processor produces the equivalent image recorded by the normal lens. The generated mapping function associated with any of the wide angle lenses may be used, for example, to dewarp an image, as described with above with reference to FIG. 9.

In an embodiment, the calibration of step 1100 includes determining a spatial relationship between any of the plurality of cameras of the 360° imaging device. For example, as shown in FIGS. 12A-12B, a first camera 1202 may be directed toward a first position 1212 and record a first image 1232, and a second camera 1204 may be directed toward a second position 1224 and record a second image 1234. The first camera 1202 and second camera 1204 can be separated by a distance D1. The first camera 1202 and second camera 1204 can be oriented at different angles, for example, if attached to a spherical surface, attached to a hinge or other rotatable device, or otherwise attached to a surface at different angles. The relative position of the first camera 1202 and second camera 1204 and/or relative image correspondence between the first image 1232 and second image 1234 can be determined.

In step 1110, the processor can store the mapping function in a database. The mapping function may include the relative position and/or image correspondence. The database may include an a cross reference for one or more other cameras so that the mapping function associated with a camera (e.g., a fisheye camera having a first set of dimensions) may also be associated with the one or more other cameras (e.g., one or more fisheye cameras having the first set of dimensions). The mapping function can be saved in a database and retrieved to identify relative positions of subsequent images recorded by the first camera 1202 and the second camera 1204, such as, for example, as described with reference to step 1140.

In step 1120, a first plurality of images corresponding to a first plurality of cameras (e.g., the first camera 1202) can be received, and a second plurality of images corresponding to a second plurality of cameras (e.g., the second camera 1204) can be received. Embodiments include receiving the first plurality of images and the second plurality of images as described above with reference to step 920 of FIG. 9. In an embodiment, received images may be dewarped as described above with reference to step 930 of FIG. 9.

In step 1140, a pixel correspondence between a first plurality of images and a second plurality of images can be determined. In an embodiment, the pixel correspondence can be determined based on an overlap area associated with the first image and the second image. Some embodiments include determining a pixel correspondence as described above with reference to step 940 of FIG. 9. In some embodiments, a pixel correspondence may be determined by utilizing the calibration performed in step 1100. In some embodiments, a pixel correspondence may be determined by utilizing the method described with reference to step 940 of FIG. 9 as well as the calibration performed in step 1100.

In an embodiment, a pixel correspondence may be determined by utilizing the calibration performed in 1100 by (1) obtaining the mapping function stored in a database, (2) using the mapping function to dewarp and/or determine an overlap area (e.g., overlap area 1236) for the first plurality of images (e.g., first image 1232) and the second plurality of images (e.g., second image 1234), and (3) determining a correspondence between a first set of pixels in a first image (e.g., an image of the first plurality of images) and a second set of pixels in a second image (e.g., an image of the second plurality of images).

Obtaining the mapping function stored in a database may involve, for example, a processor identifying a storage address of the mapping function in the database or a processor transmitting a request for the mapping function to another computing node and receiving the mapping function from the another computing node where the another computing node retrieved the mapping function from the database.

The mapping function may be used to, for example, dewarp an image (e.g., an image of the first plurality of images or the second plurality of images), determine the overlap area (e.g., overlap area 1236) for a first image (e.g., first image 1232) and a second image (e.g., second image 1234), or a combination thereof.

In an embodiment, the mapping function may be based on a lens distortion and used to dewarp an image. For example, the mapping function may indicate a rate of change of image warping extending from a center of an image to an outer portion of the image (e.g., minimal warping near a center of an image and increased warping as a distance from the center of the image increases). The rate of change of image warping indicated in the mapping function may be used to dewarp the image by reversing a warping effect caused by a lens that recorded the image.

In an embodiment, the mapping function may be based on a spatial relationship between a first image 1232 and a second image 1234 and used to determine an overlap area 1236. For example, the images may have been captured by cameras (e.g., cameras 1202, 1204) on a fixed surface such that an overlap area between the images is a fixed area. In another embodiment, images may been captured by cameras capable of rotating or swiveling (not shown) where the motion of the cameras is monitored and incorporated into the mapping function. The mapping function can determine, based on the motion of a first and/or second camera, an overlap area between a first image recorded by the first camera and a second image captured by the second camera.

The overlap area may be used to determine a pixel correlation between a first set of pixels in a first image and a second set of pixels in a second image, as described with reference to step 940 of FIG. 9.

In step 1150, the first plurality of undistorted images and the second plurality of undistorted images can be combined to generated an undistorted wide view image (e.g., a 360° image). Embodiments include combining the first plurality of images and the second plurality of images by, for example, merging corresponding pixels in a corresponding overlap area, as described with reference to step 950 in FIG. 9.

Figure 13:
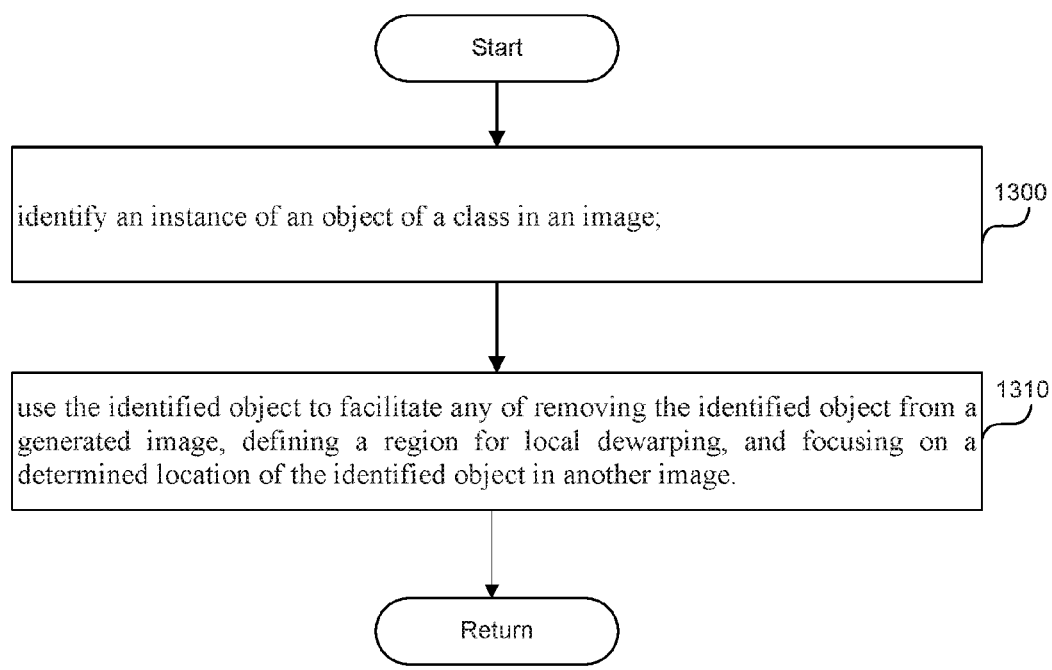
FIG. 13 is a flowchart describing a process for identifying instances of objects of a certain class in an image, according to one embodiment.

FIG. 13 is a flowchart describing a process for identifying instances of objects of a certain class in an image, according to one embodiment. Classes of objects that can be identified include, for example, humans, animals, buildings, vehicles, furniture, etc. In an embodiment, identified objects in an image may be used to facilitate, for example, cropping identified objects, focusing on identified objects, defining a region for local dewarping, or any combination thereof.

Referring to step 1300, an instance of an object of a class in an image can be identified. The identified object may be associated with one or more classes, such as, for example, humans, animals, buildings, vehicles, furniture, etc. Various methods for identifying objects of various classes are contemplated. Classes and methods for identifying objects described herein are by way of example and are not intended to limit possible methods for identifying objects of various classes. Methods for identifying objects of various classes are discussed below.

Identifying objects in an image associated with a human can be accomplished by, for example, utilizing a facial recognition system, a pedestrian recognition system, or a combination thereof. The facial recognition system can focus on detection of frontal human faces in an image by determining one or more features of an image and determining if a match exists with one or more stored features in a face database. The face database can include a covariance matrix of a probability distribution over a high-dimensional vector space of face images. The one or more stored features may include, for example, a plurality of vectors representing patterns of light and dark areas. The pedestrian recognition system can be used to detect an object associated with a pedestrian in an image by using, for example, holistic detection, part-based detection, patch-based detection, motion-based detection, detection using multiple cameras, or any combination thereof. In a preferred embodiment, multiple calibrated cameras of the 360° imaging device are used to generate a plurality of video streams from different angles around the 360° imaging device to detect one or more pedestrians. A probability occupancy map of a surrounding environment of the 360° imaging device may be generated. The probability occupancy map may include a grid with a plurality of cells. A probability that a pedestrian is occupying a cell of the plurality of cells can be determined based on, for example, a color, shape, and motion detected in the cell from a plurality of cameras of the 360° imaging device oriented in different angles. Conventional pedestrian recognition systems may require different cameras in different locations. However, the 360° imaging device may include multiple calibrated cameras in a single device where the multiple calibrated cameras can capture images and/or video streams of a surrounding environment from different angles around the 360° imaging device, and thus detect pedestrians using a multiple camera detection method with a single imaging device.

Embodiments include detecting animals with a same or similar method as detecting a human object in an image. For example, a similar method includes modifying the multiple camera detection method for detecting pedestrians by adjusting, for example, a color, shape, or motion to reflect a target animal. For example, if a polar bear is a target animal for detection, a target color may be set to white, a target shape may be defined by providing a processor with polar bear images to define a polar bear shape vector space, and a target motion may be defined by providing a processor with polar bear video to define a polar bear motion vector space. The polar bear shape vector space and the polar bear motion vector space may be used to determine a probability that a detected object is a polar bear. If a probability that a detected object is a polar bear exceeds a threshold, the detected object may be identified as a polar bear. The threshold may include, for example, a fifty percent probability, sixty percent probability, seventy percent probability, etc.

Embodiments include detecting other objects, such as, for example, vehicles, buildings, and furniture. Various approaches for detecting various objects are contemplated, such as, for example, edge detection, primal sketch, recognition by parts, divide-and-conquer search, greyscale matching, gradient matching, histograms of receptive field responses, large modelbases, and combinations thereof.

Referring to step 1310, an identified object can be used to facilitate any of: (1) removing the identified object from a generated image, (2) defining a region for local dewarping, and (3) focusing on a determined location of the identified object in another image. Various embodiments for removing the identified object from a generated image, defining a region for local dewarping, and focusing on a determined location of the identified object in another image are provided below.

In an embodiment, an identified object may be removed from an image (e.g., cropped from an image). Embodiments include an identified object being removed prior to, during, and/or after stitching of a first image and a second image (e.g., as described with reference to FIGS. 9 and 11). For example, a pedestrian may intrude in an image recorded of a landscape. A plurality of images captured of the landscape may include the pedestrian. The pedestrian may be identified in the plurality of images by, for example, utilizing a pedestrian recognition system as described above. In an embodiment, the identified object (e.g., the pedestrian) may be cropped out of the images and a stitching of the plurality of images may be performed to generate a new image having a background identified from at least one of the plurality of images in a region previously occupied by the identified object (e.g., the pedestrian). In another embodiment, a corresponding overlap area of another image may be identified for a region of the identified object in a first image and corresponding pixels in the corresponding overlap areas may be merged where the identified object are assigned a weighted distortion factor that decreases the influence of the identified object (e.g., the pedestrian). In an example, corresponding pixels (e.g., P1 and P2) in the corresponding overlap areas (e.g., an overlap area of a first image and a second image) may be merged. The first image may include the identified object in a first location and the second image may include the identified object in a second location. The first and second images may include the identified object in different locations because the first and second images may be recorded from cameras angled in different directions. A pixel P1 may be associated with the overlap area of the first image including the identified object and a corresponding pixel P2 may be associated the overlap area of the second image not including the identified object. The processor may assign a weighted distortion factor from 0 to 1 for each pixel, so that the sum of weights always equals to one. The processor creates a new pixel P0, which is equal to W1*P1+(1−W1)*P2, where 0<=W1<=1. The pixel P1 may be assigned a weighted distortion factor of 0 since it is associated with the identified object for removal. The pixel P2 may be assigned a weighted distortion factor of 1 since it is not associated with the identified object for removal. The weighted distortion factor for pixels associated with the identified object may be assigned to 0 to completely remove the identified object or a value larger than 0 to partially remove the identified object. By merging corresponding pixels with a weighted distortion factor, a new image may be generated having a completely or partially removed identified object. In an embodiment, an identified object may be given greater emphasis in an image. In an embodiment, a weighted distortion factor for pixels associated with an identified object may be assigned values at or near 1 when merging corresponding pixels in corresponding overlap areas. For example, a human face may be detected in a first image and not detected in a second image. The detected human face may be assigned a weighted distortion factor of 1 when merging corresponding pixels of the first image and the second image so that the combined image of the first image and second image includes the detected human face.

In an embodiment, an identified object may be used to facilitate defining a region for local dewarping. For example, a first camera can record a first image including a face where the face is located in a distorted portion of the image and a second camera can record a second image including the face where the face is located in a undistorted portion of the image. The detected face of the second image can be used to determine a distortion of a region of the first image including the identified face. Corresponding pixels of the face of the first image and the face of the second image may be identified and mapped to determine a distortion function. The distortion function can be used to locally dewarp a region including the detected face in the first image.

In an embodiment, an identified object may be used to facilitate focusing of 360° imaging device. For example, a detected object (e.g., a face) in a first image recorded by a first camera can be used to focus a second camera. A first camera and a second camera may be separated by a distance and an angle theta. A processor may determine a location of the identified object in the second image based on, for example, a location of the identified object in the first image and calibration data (e.g., a distance and orientation of the cameras). The determined location of the identified object in the second image may be used to focus on the determined location, even if identification of the object has not occurred for the second camera (i.e. identification may have only occurred for object in first image recorded from a first camera). Embodiments include using an identified object from one or more cameras to focus one or more other cameras based on calibration data.

Computer

Figure 14:
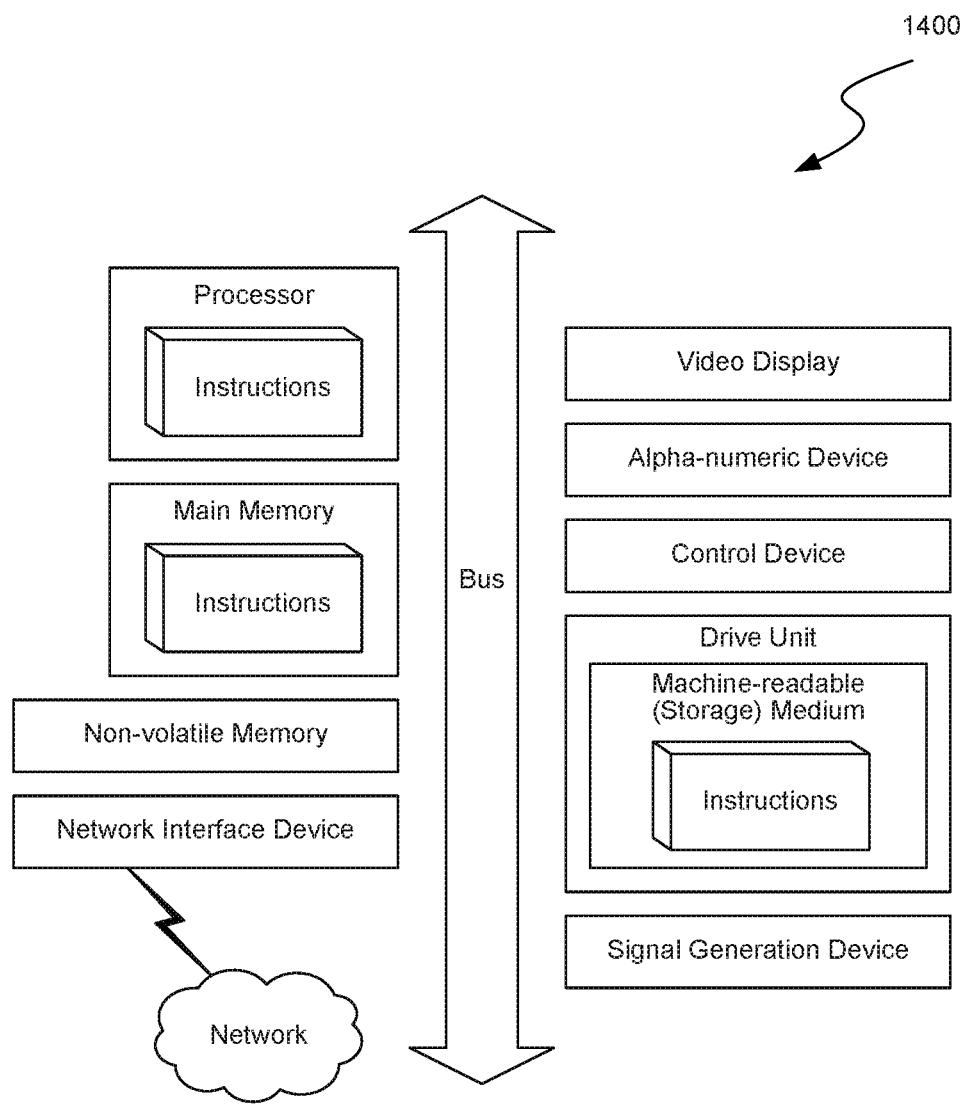
FIG. 14 is a diagrammatic representation of a computer system within which the above-described apparatus may be implemented, and within which a set of instructions for causing the machine to perform any one or more of the methodologies or modules discussed herein may be executed.

FIG. 14 is a diagrammatic representation of a machine in the example form of a computer system 1400 within which a set of instructions, for causing the machine to perform any one or more of the methodologies or modules discussed herein, may be executed.

In the example of FIG. 14, the computer system 1400 includes a processor, memory, non-volatile memory, and an interface device. Various common components (e.g., cache memory) are omitted for illustrative simplicity. The computer system 1400 is intended to illustrate a hardware device on which any of the components described in the example of FIGS. 1-13 (and any other components described in this specification) can be implemented. The computer system 1400 can be of any applicable known or convenient type. The components of the computer system 1400 can be coupled together via a bus or through some other known or convenient device.

This disclosure contemplates the computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1400 may include one or more computer systems 1400; be unitary or distributed; span multiple locations; span multiple machines; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

The processor may be, for example, a conventional microprocessor such as an Intel Pentium microprocessor or Motorola PowerPC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 1400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1400. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 20 reside in the interface.

In operation, the computer system 1400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to generate an undistorted 360° image of a surrounding environment, the method comprising:
    receiving a first plurality of images corresponding to a first plurality of cameras, and a second plurality of images corresponding to a second plurality of cameras from a 360° imaging device, wherein at least one camera of the first plurality of cameras and the second plurality of cameras has a wide angle lens;
    dewarping a distorted image of the first plurality of images or the second plurality of images, wherein the at least one camera having the wide angle lens recorded the distorted image;
    determining a pixel correspondence between a first image in the first plurality of images and a second image in the second plurality of images, based on a corresponding overlap area associated with the first image and the second image; and
    combining the first plurality of images and the second plurality of images by merging corresponding pixels in the corresponding overlap area, said merging comprising:
        for each pixel in the first image associated with the corresponding overlap area, assigning a first weight, and wherein the first weight is associated with a determined distortion of a pixel in the first image; and for each corresponding pixel in the second images associated with the corresponding overlap area, weighing the pixel by a second weight, wherein the second weight increases as the first weight decreases; wherein the weight dictates a proportional contribution of each pixel to values of a merged pixel; and tiling one or more non-overlapping areas and the corresponding overlap area to obtain a 360° image.

2. The method of claim 1, further comprising:
obtaining a plurality of mapping functions corresponding to the at least one camera having the wide angle lens, wherein a mapping function in the plurality of mapping functions comprises a transformation, wherein when the transformation is applied to the distorted image associated with the wide angle lens, the transformation dewarping the distorted image and producing an undistorted image.

3. The method of claim 2, wherein said obtaining the plurality of mapping functions comprises:
recording a first image using the wide angle lens;
recording a second image using a normal lens, wherein the normal lens is disposed the same way as the wide angle lens;
calculating the mapping function; and
storing the mapping function in a memory device.

4. The method of claim 2, wherein said obtaining the plurality of mapping functions comprises retrieving the plurality of mapping functions from a memory device.

5. The method of claim 1, wherein the said determining the pixel correspondence comprises:
identifying a plurality of overlap areas associated with the first image in the first plurality of images and the second image in the second plurality of images;
calculating a plurality of first match scores corresponding to the plurality of overlap areas;
identifying an overlap area of the plurality of overlap areas having a highest first match score of the plurality of first match scores as the corresponding overlap area;
identifying one or more first set of pixels in the corresponding overlap area of the first image and one or more second set of pixels in the corresponding overlap area of the second image;
calculating a plurality of second match scores corresponding to the one or more first set of pixels and the one or more second set of pixels; and
identifying the one or more first sets of pixels and the one or more second sets of pixels having a highest second match score of the plurality of second match scores as corresponding pixels.

6. The method of claim 1, further comprising:
compressing the undistorted 360° image by storing image data of an identified object in a database and inserting a reference to the stored image data of the identified object in the database; and
encrypting the inserted reference to the stored image data of the identified object.

7. The method of claim 1, further comprising:
identifying an object of a class in an image of the first plurality of images or the second plurality of images.

8. The method of claim 7, further comprising:
performing any of:
removing the identified object from the image by merging pixels of the identified object with corresponding pixels of a corresponding overlap area, wherein the pixels of the identified object are assigned a weight of 0; or
locally dewarp a region surround the identified object by mapping corresponding pixels of the identified object in the first image and the second image to determine a distortion function and utilizing the distortion function to normalize the region surrounding the identified object.

9. The method of claim 1, further comprising:
identifying an object of a class in an image of the first plurality of images or the second plurality of images recorded by a camera of the first plurality of cameras or the second plurality of cameras;
determining a location of the identified object in another image recorded by another camera; and
focusing on the determined location of the identified object in the another image recorded by the another camera.

10. The method of claim 1, wherein merging corresponding pixels comprises evaluating weighted scores associated with a residual distortion of the corresponding pixels to determine a proportional contribution of each of the corresponding pixels.

11. An imaging device capable of recording an undistorted full view of a surrounding environment, the imaging device comprising:
a first plurality of cameras comprising a plurality of wide angle lenses, wherein the first plurality of cameras is configured to record a first plurality of images associated with the surrounding environment,
a second plurality of cameras comprising a plurality of normal lenses, wherein the second plurality of cameras is configured to record a second plurality of images associated with the surrounding environment; and
a processor configured to perform a method comprising:
obtain the first plurality of images and the second plurality of images;
dewarp the first plurality of images;
determine a pixel correspondence between a first image of the first plurality of images and a second image of the second plurality of images, based on a corresponding overlap area associated with the first image and the second image; and
combine the first plurality of images and the second plurality of images by merging corresponding pixels in the corresponding overlap area, said merging comprising:
for each pixel in the first image associated with the corresponding overlap area, assigning a first weight, and wherein the first weight is associated with a determined distortion of a pixel in the first image; and
for each corresponding pixel in the second images associated with the corresponding overlap area, weighing the pixel by a second weight, wherein the second weight increases as the first weight decreases; wherein the weight dictates a proportional contribution of each pixel to values of a merged pixel; and
tiling one or more non-overlapping areas and the corresponding overlap area to obtain an undistorted full view image associated with the surrounding environment.

12. The imaging device of claim 11, wherein the processor comprises any of:
a processor within the imaging device; and
a processor connected to the imaging device.

13. The imaging device of claim 11, wherein determining the pixel correspondence comprises:
- identifying a plurality of overlap areas associated with the first image in the first plurality of images and the second image in the second plurality of images;
- calculating a plurality of first match scores corresponding to the plurality of overlap areas;
- identifying an overlap area of the plurality of overlap areas having a highest first match score of the plurality of first match scores as the corresponding overlap area;
- identifying one or more first set of pixels in the corresponding overlap area of the first image and one or more second set of pixels in the corresponding overlap area of the second image;
- calculating a plurality of second match scores corresponding to the one or more first set of pixels and the one or more second set of pixels; and
- identifying the one or more first sets of pixels and the one or more second sets of pixels having a highest second match score of the plurality of second match scores as corresponding pixels.

14. The imaging device of claim 11, wherein each image in the first plurality of images comprises a first image periphery distorted by a wide angle lens in the plurality of wide angle lenses, and a first image center undistorted by the wide angle lens; and wherein each image in the second plurality of images comprises a second image center undistorted by a camera in the second plurality of cameras, wherein the second plurality of image centers associated with the second plurality of images overlaps the first plurality of image peripheries associated with the first plurality of images.

15. The imaging device of claim 11, wherein merging corresponding pixels comprises evaluating weighted scores associated with a residual distortion of the corresponding pixels to determine a proportional contribution of each of the corresponding pixels.

* * * * *